(12) United States Patent
Benrachi et al.

(10) Patent No.: US 10,650,624 B2
(45) Date of Patent: May 12, 2020

(54) SYSTEM AND MANAGEMENT METHOD OF PERSONAL DATA IN A MASS GATHERING

(71) Applicant: BULL SAS, Les Clayes-sous-Bois (FR)

(72) Inventors: Samia Benrachi, Châtenay-Malabry (FR); Taoufik Mohib, Riyadh (SA); Emmanuel Wensink, Bern (CH)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/233,698

(22) Filed: Dec. 27, 2018

(65) Prior Publication Data

US 2019/0206159 A1 Jul. 4, 2019

(30) Foreign Application Priority Data

Dec. 31, 2017 (FR) ...................................... 17 63427

(51) Int. Cl.
*G07C 9/00* (2020.01)
*G06Q 10/08* (2012.01)

(52) U.S. Cl.
CPC ..... *G07C 9/00087* (2013.01); *G06Q 10/0833* (2013.01); *G07C 9/00103* (2013.01); *G07C 9/00111* (2013.01); *G07C 9/00119* (2013.01); *G07C 2009/00095* (2013.01)

(58) Field of Classification Search
CPC .. G06Q 10/06; G07C 9/0087; G07C 9/00103; G07C 9/00111; G07C 9/00119; G07C 2009/00095
See application file for complete search history.

(56) References Cited

U.S. PATENT DOCUMENTS

| | | | | |
|---|---|---|---|---|
| 7,715,593 | B1* | 5/2010 | Adams | G06Q 20/327 340/5.53 |
| 8,009,013 | B1* | 8/2011 | Hirschfeld | G07C 9/00111 235/375 |
| 9,171,434 | B2 | 10/2015 | Faaborg et al. | |
| 2002/0069084 | A1* | 6/2002 | Donovan | G06Q 50/265 705/325 |
| 2009/0143045 | A1* | 6/2009 | Graves | A61B 5/02055 455/404.1 |
| 2009/0266882 | A1* | 10/2009 | Sajkowsky | G06K 17/00 235/380 |
| 2010/0222073 | A1* | 9/2010 | Aninye | B60R 25/1004 455/456.1 |

(Continued)

FOREIGN PATENT DOCUMENTS

| | | |
|---|---|---|
| WO | 2015195166 A1 | 12/2015 |
| WO | 2016092246 A1 | 6/2016 |
| WO | 2017069602 A1 | 4/2017 |

OTHER PUBLICATIONS

Search report issued in corresponding French Patent Application No. 1763427 dated Jul. 11, 2018, 2 pages.

*Primary Examiner* — Thien M Le
*Assistant Examiner* — Asifa Habib
(74) *Attorney, Agent, or Firm* — Pearne & Gordon LLP

(57) ABSTRACT

The invention relates to a personal electronic bracelet (40) for management of personal data of a participant at a mass gathering comprising a communication module (41) capable of receiving personal data of the participant in encrypted form, a storage module (42) capable of storing the personal encrypted data of the participant and an electronic closing mechanism (43) configured to change state following receipt of a change of state datum.

13 Claims, 5 Drawing Sheets

(56) References Cited

U.S. PATENT DOCUMENTS

Figure 1:
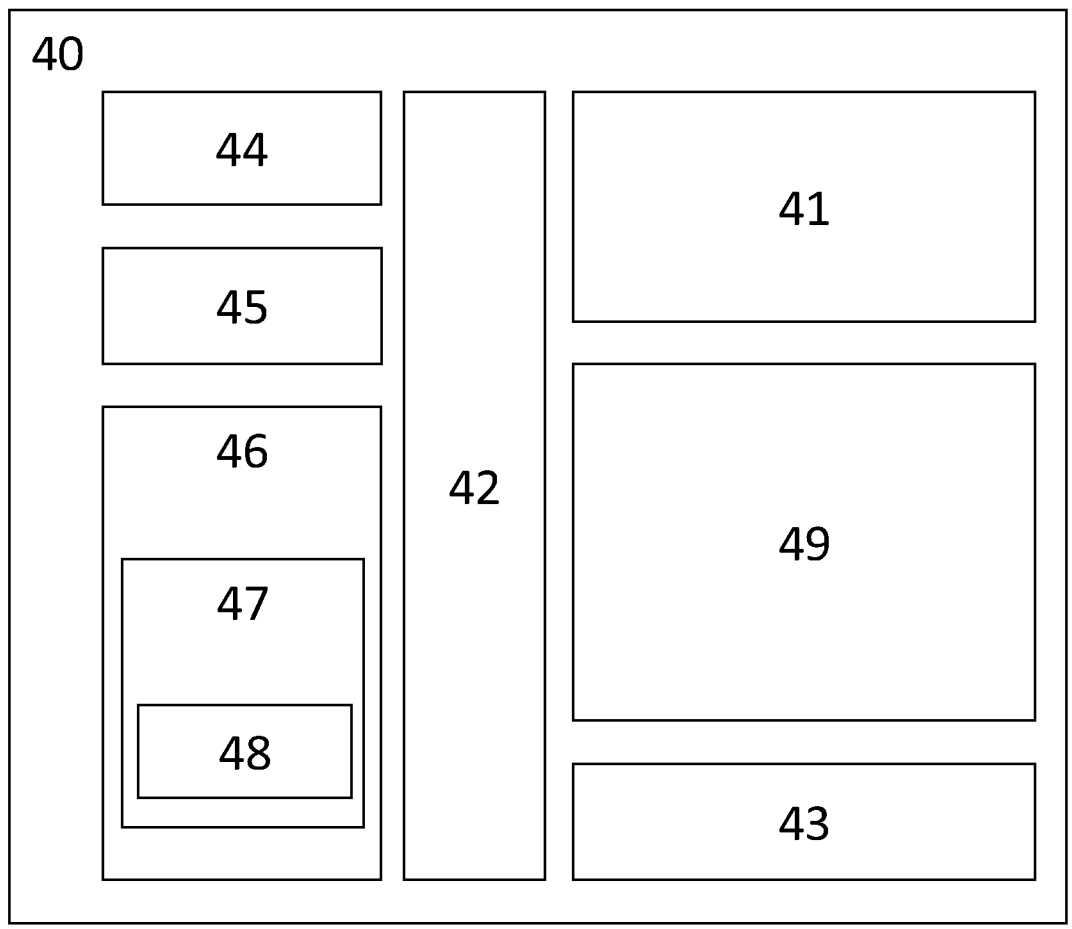

| | | |
|---|---|---|
| 2010/0238033 A1 | 9/2010 | Blumel et al. |
| 2012/0154148 A1 | 6/2012 | Mohandes |
| 2014/0097939 A1* | 4/2014 | Pham ............... H04W 4/90 340/8.1 |
| 2014/0114807 A1* | 4/2014 | Baker .............. G06Q 30/016 705/26.41 |
| 2014/0122040 A1* | 5/2014 | Marti ............... G06F 17/5009 703/6 |
| 2014/0122187 A1* | 5/2014 | Warkentin ........ G06Q 10/0639 705/7.38 |
| 2014/0143801 A1* | 5/2014 | Russell ............ H04N 21/814 725/33 |
| 2014/0203909 A1 | 7/2014 | Elgebaly et al. |
| 2014/0205155 A1 | 7/2014 | Chung et al. |
| 2016/0247378 A1* | 8/2016 | Baczuk ............... H04W 4/70 |
| 2016/0299736 A1* | 10/2016 | Bates ............... G06F 3/04847 |
| 2017/0039833 A1 | 2/2017 | Baczuk et al. |
| 2017/0111760 A1* | 4/2017 | Shen ................. H04W 4/02 |
| 2017/0293985 A1 | 10/2017 | Deria et al. |
| 2017/0352257 A1* | 12/2017 | Oliver ............... H04W 4/33 |
| 2017/0372188 A1* | 12/2017 | Simon ............... G07C 5/008 |
| 2018/0247476 A1* | 8/2018 | Kusens ............. G16H 10/60 |

\* cited by examiner

SYSTEM AND MANAGEMENT METHOD OF PERSONAL DATA IN A MASS GATHERING

The invention relates to the field of mass gathering management, and more particularly a device and a management system of personal data which can be used to facilitate the management of participants at a mass gathering and allow the providing of personalised services to these participants. The invention also relates to a management method of personal data in a mass gathering capable especially of improving security of the gathering and the experience of the participant.

PRIOR ART

Large gatherings, also called mass events or mass gatherings, are characterized by a large number of people attending or participant in a public event, for example a pilgrimage, a sports competition or a concert. With the rise in population, communication and democratisation of transport over long distances, these large gatherings are more and more frequent and involve increasingly larger and more disparate numbers of people.

Events likely to attract the largest number of people are often pilgrimages such as the Hajj which is the biggest annual populational gathering worldwide, the Kumbh Mela which is the biggest gathering of Hindus worldwide or even papal masses, often several attracting millions of people. For 2011, the central department for statistics and information of the Kingdom of Saudi Arabia identified close to 3 million pilgrims for the Hajj. In this way, the Hajj pilgrimage gathers several million people every year over a few days only. It is increasingly probable that this number will reach 10 million visitors per year in a few years. Apart from pilgrimages, those events likely to assemble a resulting crowd are for example sports events (e.g. world cup or Olympic Games) or cultural events (e.g. Universal Exhibition). For example, for the Olympic Games of 2024 in France, the number of spectators expected on average during the fortnight of the games is estimated at over three million including 500,000 overseas visitors.

The presence of a large number of people participating in mass gatherings generally brings disturbances and participants cannot fully enjoy the experience. The causes of these disagreements can vary widely but are often linked to the number of participants needed to be controlled, via identity verification procedures (including for example taking fingerprints) which are often long, or it is difficult to plan and respect such planning (e.g. non-respect of schedules). For mass gatherings bringing together several million people, this becomes a genuine challenge in airports and the other entry points but also in the region of accommodation. Participants can experience disturbances as far as the outskirts of the gathering, for example in terms of housing, health services or even slowdowns associated with major congestion of the road system due to simultaneous convergence of big groups of participants at transport intersections.

The associated difficulties are mainly caused both by the number of people wanting to attend this event and also by the fact that the processed information is highly sensitive and needs extremely rigorous review. Accordingly, authorities in charge of the managing a large gathering, responsible for managing and accompanying participants, are confronted with a difficult task, since a single error in an identity check can cause serious risks for the whole community, whereas an excessively long procedure can cause unacceptable nuisance value for participants. In particular, checking identities has become a major problem during the pilgrimage to Mecca (Hajj), with a rising number of pilgrims and the occurrence of congestion or crowd movement which can be sources of accidents. Further, it is possible that the participant loses some of his identity papers, such as passport, the residence permit and national identity card. This happens especially on the Hajj pilgrimage, requiring the special garment of the Ihram to be worn. With passports being lost, participants are delayed in returning to their country of origin, which imposes an extra burden not only on participants but also on national authorities. Similarly, in case of accident, the presence of personal data which health authorities can access easily and securely could make patient care easier.

In general, techniques used most for managing identities are techniques associated with entry and exit checks. All the same, such a check is not adapted to all gatherings and some gatherings need to reduce the control time while retaining a high level of security. Automated management methods of participants have been proposed. For example, a method based on the use of a passive RFID label for identification of pilgrims in holy areas during the Hajj has been proposed. Within the scope of this technology, on presentation of the label to a portable reader, all information relative to the pilgrim in possession of the label will be displayed on the screen of the reader. All the same, the proposed technology has no security for data and management of centralised exchanges.

In this way, there is a difficulty in effectively managing the personal data and there is no robust and secure solution, in the scope of a mass gathering, to quickly ensure the identity of a participant. In fact, the device of a participant can be modified or exchanged without this being identified by the authority in charge of management of the mass gathering. This indecision delays democratisation of automated solutions and maintaining the existence of major congestion due to the convergence of large groups of pilgrims especially at the Haram during the period of the Hajj.

There is therefore a need for a method, a device or a system for improving conditions of participation in major gatherings and especially reduce waiting times which can occur at different moments of the event, while ensuring reliability and a safeguarding handled data.

TECHNICAL PROBLEM

The aim of the invention therefore is to rectify the disadvantages of the prior art. In particular, the aim of the invention is to propose a management device of personal data in the scope of a mass gathering, said device improving management of the safety of people and enabling the combat against fraud during said gathering.

Another aim of the invention is to propose a management system of personal data in the scope of a mass gathering, attracting at least several thousand people, at an assembling point, said system which can be used to verify the identity of people, propose value-added services to them especially in the scope of planning their travel and finally assisting them during any exchanges with health authorities.

BRIEF DESCRIPTION OF THE INVENTION

For this purpose, the invention relates to a personal electronic bracelet for management of personal data of a participant at a mass gathering, comprising:
  a communication module capable of receiving personal data of the participant in encrypted form, a storage module capable of storing the personal encrypted data of the participant and an electronic closing mechanism configured to change state following receipt of a change of state datum.

In this way, the invention relates to a bracelet having the advantage of being able to reduce the duration of identity verification procedures and retain a high level of demand in terms of securing data. It also compensates the difficulty of identifying some pilgrims and moving outside the language barrier.

Such a system is particularly useful in the scope of the management of gatherings such as small ones and the pilgrimage to Mecca, especially via better management of the personal data of participants.

The presence of personal data in encrypted form allows control of data dissemination and makes them accessible to authorised entities even in the event of communication disruption. The electronic closing mechanism changing state following receipt of a datum prevents manual opening and accidental or intentional loss of the bracelet.

According to other optional characteristics of the bracelet:

the change of state datum is a biometric datum associated with an operator responsible for said participant. Preferably, the biometric datum is a fingerprint. In this way, the bracelet can be locked and unlocked only by the operator responsible for the participant. This responds to the security challenges of such devices comprising sensitive information and being employed for identity verifications.

the personal data of the participant comprise: identity data, travel data and health data.

the communication module is capable of communicating with a third-party device and is configured to allow access, by said third-party device, to only some of the personal data of the participant. For example, the data are encrypted such that the third-party device can decrypt only some personal data, even with the adequate decryption key.

it is configured to send a message via a communication module to an operator responsible for said participant should it be opened by force.

The invention further relates to a management system of personal data in the scope of a mass gathering, said management system comprising a personal electronic bracelet according to the invention and a secure platform, said secure platform comprising a personal data module, configured to store personal data of the participant.

According to other optional characteristics of the system:

it further comprises at least one third-party device configured to access only some of the personal data of the participant. For example, the third-party device can be configured to transmit an identifier to the personal electronic bracelet, receive any or some of the personal data of the participant in encrypted form and decrypt only some of the personal data of the participant.

at least one of the third-party devices is capable of accessing personal data comprising a visa number, comparing the visa number to a predetermined list and generating an alert instruction as a function of said comparison. Because of this the system according to the invention allows fast and secure identity control and can cause a reduction in wait time for example in airports during mass gatherings. Such a third-party device can for example take the form of a security checkpoint which can be used in an airport. In this way, during arrival of a participant, the checkpoint could access many personal identity data such as name, first name, biometric datum of the participant and airport of arrival, and including a visa number. The predetermined list can comprise other information which can form the subject matter of a comparison with the airport of arrival advantageously. The predetermined list can for example have been sent by the authorised server. The alert instruction preferably generates a signal of audio or visual type. It can for example consist of an instruction configured to light a pilot light, actuate a loudspeaker or send a message to an electronic device. The alert prevents access of a zone to a participant a priori non-authorised.

at least one third-party device is a third-party device for access control to a vehicle configured to:

access some of the personal data of the participant, control some of the personal data of the participant, then record personal data of the participant if the participant is authorised to enter said vehicle.

The vehicle can preferably be a public vehicle transport. Further, the control of data can be done for example via comparison of these data with a list of participants authorised to board the vehicle.

the secure platform comprises an analysis module configured to:

receive an alert message coming from a personal electronic bracelet, load a geographic position of the personal electronic bracelet, load distribution data of participants and determine a zone having high probability of the risk of crowd movement from loaded data;

receive an alert message coming from a personal electronic bracelet of a participant, load a geographic position of the personal electronic bracelet, load distribution data of participants and generate propositions of optimal ways for dispatching care and evacuation of the participant wearer of the bracelet.

Advantageously, these analyses can then be processed by representation applications so as to highlight the pertinent information (format of "heat maps" type). In this way, the analysis module can generate statistical data to improve the safety of participants. These analysed data can also be recorded in the form of files on a memory.

the secure platform comprises a planning and access control module configured to correlate distribution information of participants with the mass gathering, with the visit planning information and positioning information of the personal electronic bracelet so as to generate access authorisations to zones for the wearer of said bracelet.

the planning and access control module is configured to:

receive an access authorisation request to a zone by the personal electronic bracelet, load visit planning data for the wearer of said bracelet and transmit access authorisation to the personal electronic bracelet or to a third-party device as a function of the schedule and visit planning data. In this way, the wearer might just be barred from access to a zone if access schedules authorised for the wearer of the personal electronic bracelet are not respected, identify the position of the personal electronic bracelet, load visit planning data for the wearer of said bracelet and transmit to the personal electronic bracelet a message as a function of the schedule, of the position of the bracelet and visit planning data; in this way, the wearer could receive a reminder of the exit schedule from the zone or a demand for immediate exit from the zone if the visit schedule is exceeded;

load distribution data of participants, load a geographic position of the personal electronic bracelet and determine planning of visits as a function of loaded data; and/or transmit to a server, or to a third-party device, personal data of a participant having exceeded the allocated time on a zone. In this way, the authorities and the organizer responsible could detect an infraction of the participant.

The invention further relates to a management method of personal data in the scope of a mass gathering, said personal data being recorded on a personal electronic bracelet according to the invention, said method comprising a configuration step of the personal electronic bracelet comprising the following steps:

configuration of the closing mechanism such that it is capable of changing state following receipt of a change of state datum.

recording of personal encrypted data on the storage module, and configuration of the communication module such that it is capable of transmitting some of the personal encrypted data following receipt of an identification datum from an authorised third-party device.

The invention further relates to a management method of personal data in the scope of a mass gathering, said personal data being recorded on a personal electronic bracelet according to the invention, said method comprising a configuration step of a third-party device comprising the following steps:

creation of a unique identification key, capable of allowing access of a third-party device to a personal electronic bracelet, creation of a decryption key of personal encrypted data, capable of decrypting only some of the personal data of the personal electronic bracelet, and recording of the unique identification key and the decryption key on a third-party device.

In this way, the personal electronic bracelet will send the personal data to a third-party device only which will have sent the expected key, said expected key preferably being different for each personal device.

Other advantages and characteristics of the invention will emerge from the following description given by way of illustrative and non-limiting example in reference to the appended figures, in which:

FIG. 1 schematically illustrates the personal electronic bracelet for management of personal data according to the invention.

Figure 2:
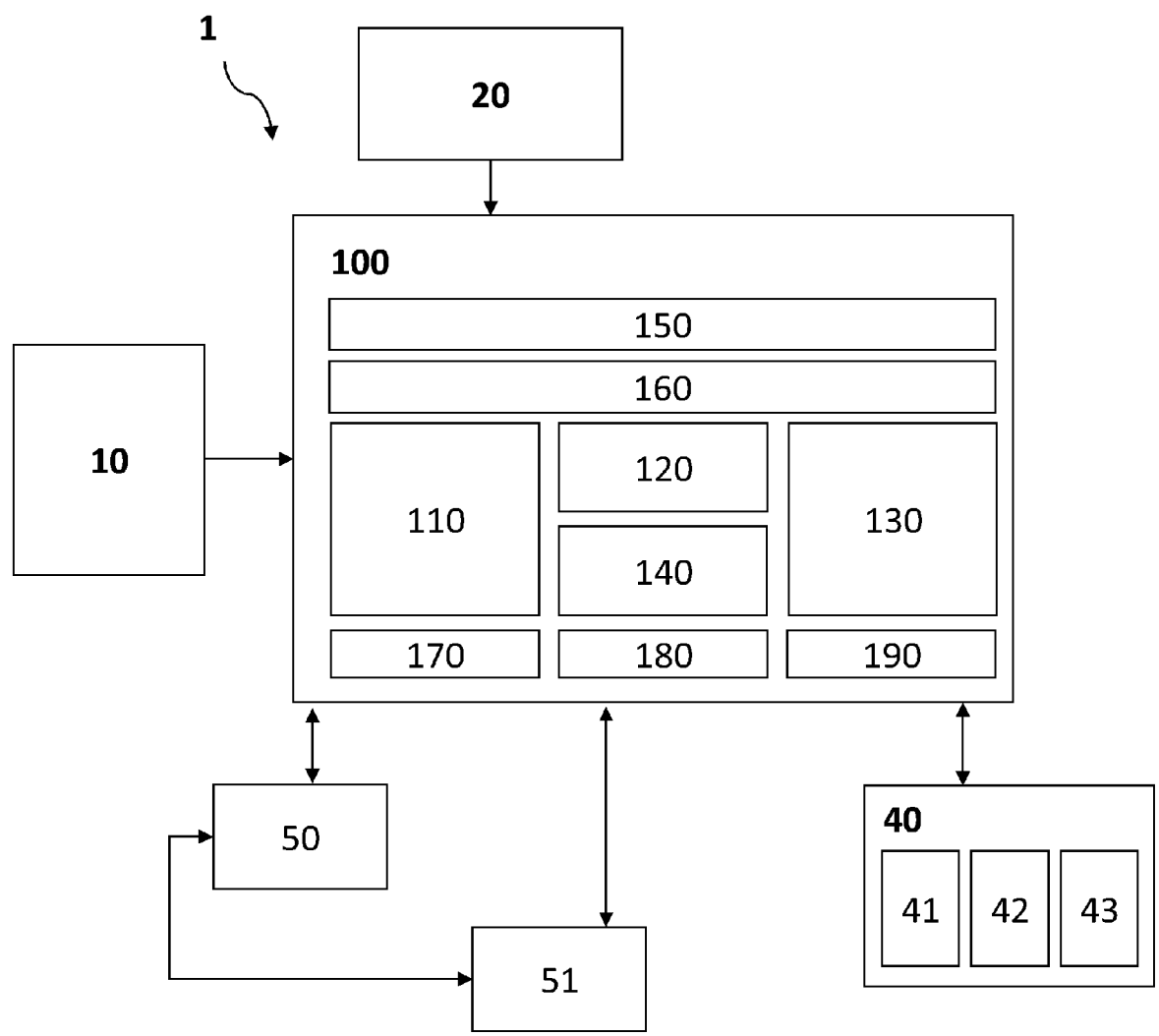
Figure 3:
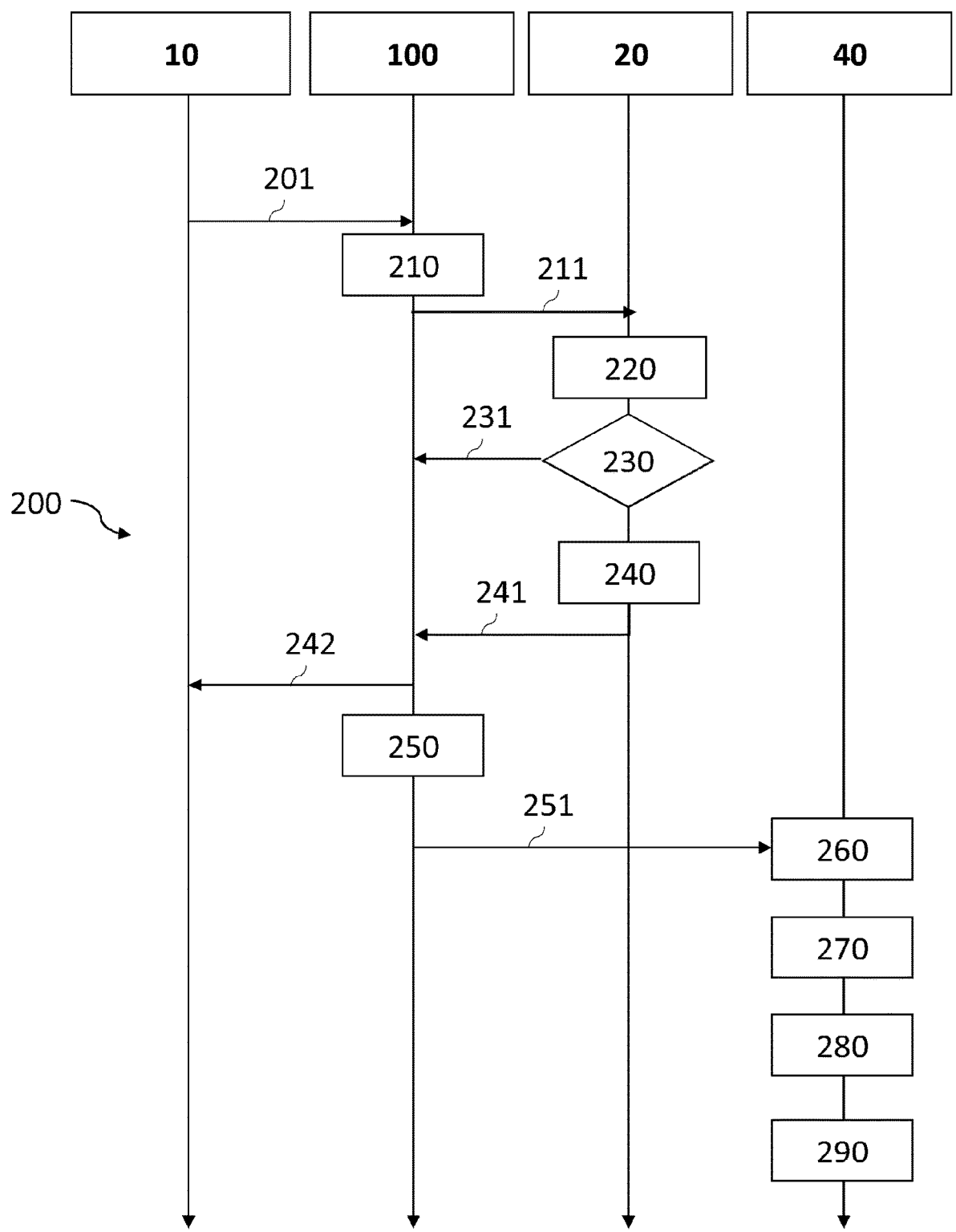
Figure 4:
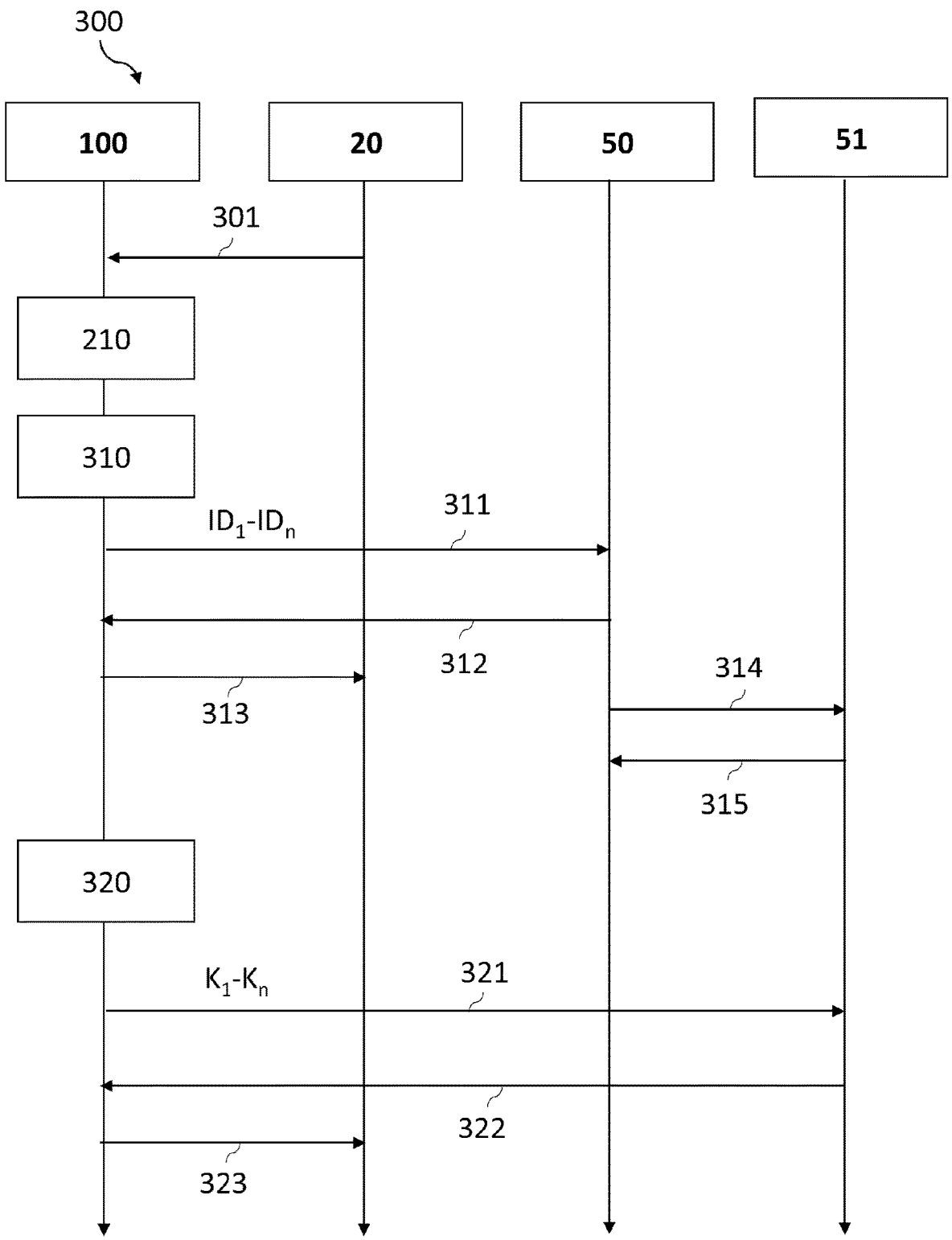
Figure 5:
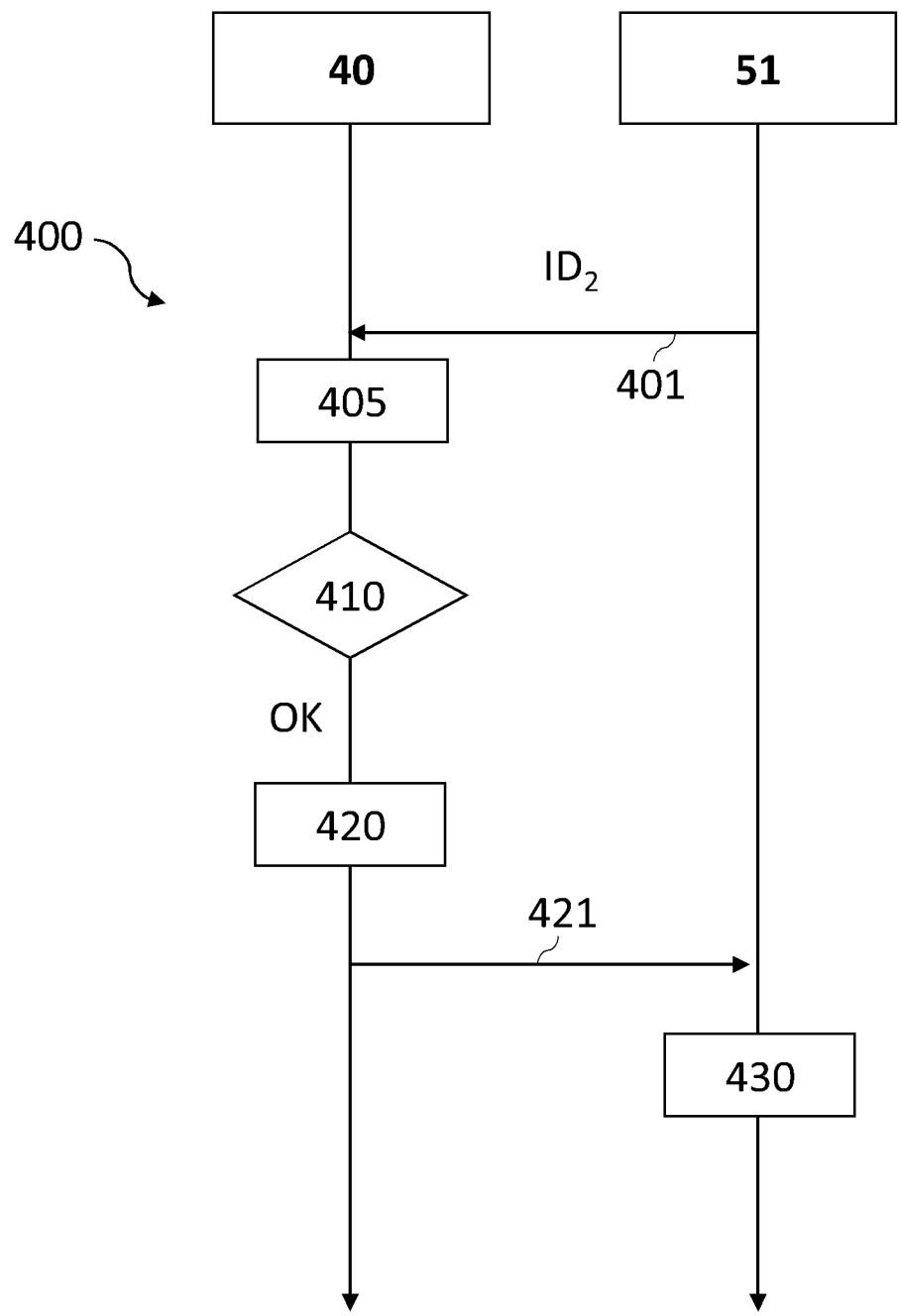

FIG. 2 schematically illustrates the management system of personal data according to the invention, FIG. 3 schematically illustrates a configuration step of the personal electronic bracelet for management of personal data according to an embodiment of the invention, FIG. 4 schematically illustrates a configuration step of third-party devices according to an embodiment of the invention, FIG. 5 schematically illustrates a step for access to personal data of an electronic bracelet in terms of an embodiment of the invention,

DESCRIPTION OF THE INVENTION

Throughout the description, "geographic location" means a place which can be defined by its surface area, constituted by external zones and/or internal zones.

The term "mass gathering" according to the invention corresponds to a planned or spontaneous event, preferably planned, which will attract a number of participants likely to considerably strain the resources of planning and action by administrators or of the host country. The Olympic Games, the Hajj and other major sporting, religious or cultural events are such examples.

According to the invention the term "distribution" refers to a number or to movement of people. The number can be expressed according to several dimensions as by density (e.g. person/m$^2$), a total number (e.g. in hundreds of), a percentage (e.g. number of people/capacity of the zone). The movement corresponds to an entry and exit number of the geographic location or of a part of the geographic location. In this way, the "distribution datum" according to the invention corresponds to one or more values.

In terms of the invention "parameter" means a value obtained by transformation of raw data and which can be then used within a model. This applies especially to transformation of a series of images of a video or to transformation of a series of values obtained via a network sensor.

In terms of the invention "model" or "rule" or "algorithm" is to comprise a finite suite of operations or instructions for calculating a value by means of a classification or partitioning of data within groups previously defined Y, and attributing a score or hierarchizing one or more data within a classification. Executing this finite suite of operations for example attributes a label Y to an observation described by a set of characteristics or parameters X for example by way of executing a function f likely to reproduce Y having observed X.

$$Y=f(X)+e$$

where e symbolises noise or measurement error.

In terms of the invention "supervised learning method" means a method for defining a function f from a base of n labelled observations $(X_{1\ldots n}, Y_{1\ldots n})$ where Y=f (X)+e. "Non-supervised learning method" means a method aiming to hierarchize data or divide a set of data into different homogeneous groups, the homogeneous groups sharing common characteristics, and this without the observations being labelled.

In terms of the invention "maintenance" or "action maintenance" means an activity aimed at repairing, reloading, cleaning or replacing an installation. In terms of the invention "installation" means a building, a local, a dwelling but also equipment (e.g. distributor of water, furniture). "Maintenance resources" means maintenance people, also called "maintenance technician" qualified to perform maintenance actions, or devices which may be necessary for performing maintenance actions.

In terms of the invention "process", "calculate", "determine", "display", "extract" "compare" or more widely "executable operation" means an action performed by a device or a processor, except if the context indicates otherwise. In this respect, operations relate to actions and/or processes of a data-processing system, for example a computer system or an electronic computer device, which manipulates and transforms the data represented as physical quantities (electronic) in the memories of the computer system or other storage, transmission or display of information devices. These operations can be based on applications or software.

The terms or expressions "application", "software", "program code", and "executable code" signify any expression, code or notation, of a set of instructions intended to cause processing of data to perform a particular function directly or indirectly (e.g. after a conversion operation to another code). The examples of program code can include, without being limited, a sub-program, a function, an executable application, a source code, an object code, a library and/or any other sequence of instructions designed for execution on a computer system.

In terms of the invention "processor" means at least one hardware circuit configured to execute operations according to instructions contained in a code. The hardware circuit can be an integrated circuit. Examples of a processor comprise, without being limited, a central processing unit, a graphics processor, an integrated circuit specific to the application (ASIC) and a programmable logic circuit.

In terms of the invention "coupled" means connected directly or indirectly to one or more intermediate elements. Two elements can be coupled mechanically, electrically or linked by a communication channel.

Throughout the description, the same references are used to designate the same elements.

The invention relates to a device, a system or a method for facilitating management of personal data in the scope of a mass gathering. The events likely to assemble the most people are often pilgrimages, sporting events or cultural events. The present invention, though applicable to many mass gatherings, will be illustrated more particularly in a context of pilgrimage to Mecca, for example during the pilgrimage or of the minor pilgrimage. In fact, the pilgrimage to Mecca represents some five million visitors each year to the towns of Mecca and Madinah in Saudi Arabia. These visitors meet up in particular during the annual ritual of the Hajj which is held over a precise number of days of the month of Dhul-Hijja of each lunar year, more particularly during the first twelve days. In 2017, the first day of the month of Dhul-Hijja of the lunar year 1437 was Aug. 23, 2017.

The Hajj pilgrimage extends over a geographic location corresponding to Mecca or more than 1000 km². During this pilgrimage, participants at the Hajj, also called Hajjis, will pray five times per day in the same gathering places and will perform the same actions of worship as explained. They will have to walk seven times round the Kaaba for instance, make the walk between Safa and Marwa seven times, drink from the Well of Zamzam then go to the site of "Mina" 4 km from Mecca and say afternoon (asr), evening (maghreb and icha) and morning (fajr) prayers. They are also to travel to Mount Arafat where they say midday and afternoon prayers, then go to "Muzdalifah" to say evening prayers. The next day, the pilgrim returns to Mina to carry out prescribed rites, ie a trip of about 17 km (return trip). Further, pilgrims generally visit the mosque of the Prophet Mohamed (PSSL), Al-Masjid an-Nabawi, at Madinah.

In this way, with several millions of pilgrims travelling across this territory over a very short period, administrations in charge of managing the gathering and more particularly checking participants are placed under high pressure. In fact, managing such an event represents an exceptional challenge especially as relates to the management of personal data of participants and particularly also in terms of prevention of fraud, the management of medical emergencies or more widely improvement of the experience lived by the pilgrim.

As presented in FIG. 1, according to a first aspect the invention relates to a personal electronic bracelet 40 for example associated with a participant at a mass gathering and an operator responsible for said participant. This mass gathering which can attract for example at least several thousand people, preferably over 100,000 people, more preferably over a million people.

The operator responsible for the participant is generally the person, an employee of an organizing company for travel by the participant, who will be in charge of the participant during the mass gathering. For instance, it is the organizing company which will have planned the presence of the participant at the mass gathering. This includes for example the administrative steps to obtain a visa, buying a travel ticket, renting accommodation, any enrolment with the gathering and/or planning of any visits.

The personal electronic bracelet 40 comprises an electronic closing mechanism 43 configured to change state following receipt of a change of state datum, preferably coming from the operator responsible for said participant. The change of state corresponds to the opening or the closing of the electronic closing mechanism.

Advantageously, the change of state datum of the operator responsible is a biometric datum, preferably a datum relative to the fingerprint of the operator responsible. In this case, the bracelet can comprise a fingerprint reader. The fingerprint reader can especially be configured to read a fingerprint, generate a fingerprint reading datum, then verify the match between the fingerprint reading datum and a datum relative to the fingerprint of the responsible operator recorded on the bracelet 40.

The electronic bracelet 40 personal comprises also a storage module 42 capable of storing the personal data of the participant in encrypted forms.

The personal data of the participant can for example comprise: identity data, travel data and health data. For example, this storage module 42 is more particularly capable of recording:
  identity data corresponding for example to the name, address, passport number, visa number, stay authorisation dates;
  travel data corresponding for example to the name of the reserved hotel, its address, reservation dates, and
  health data corresponding for example to data essential for emergency medical processing such as blood group, rhesus, significant medical history and allergies.

For this, the storage module 42 can comprise a transitory memory and/or a non-transitory memory. The non-transitory memory can be a support such as a CDrom, a memory card, or a hard drive for example hosted by a remote server.

As has been said, the storage module 42 is configured to comprise encrypted data. The invention presents the particular feature of securing the personal data of the participant and making them highly accessible, but only to authorised entities. Accordingly, personal data are recorded on the personal bracelet in encrypted form. Further, even an authorised third party could have restricted access and could not access all information. Therefore, personal data can for example be compartmented such that all information is not accessible to an authorised third party. For example, a control authority at the border of a country will have no need to know the information relative to the medical file of the participant. Similarly, a doctor might not be authorised to access personal information associated for example with the visa of the participant needing care. On the contrary, he could have access by way of the third-party device to all the information in the medical file contained in the personal bracelet. The personal data recorded on the personal bracelet can for example be encrypted according to a symmetrical or asymmetrical encryption algorithm such as for example an algorithm selected from the following encryption algorithms: RSA, DSA ("Digital Signature Algorithm"), DES ("Data Encryption Standard"), triple DES, AES ("Advanced Encryption Standard").

Further, the personal electronic bracelet 40 can comprise a communication module 41 for example capable of communicating with a device, a platform or a computer system. Because of this communication module 41, the bracelet 40 is capable of communicating with various electronic communicating devices such as for example the organizer server, the secure platform 100, and third-party devices 51. The communication module 180 is configured to receive and transmit information to remote systems such as sensors, tablets, telephones, computers or servers. The communication module transmits data over at least one communication network and can comprise wired or wireless communication. Preferably, communication is carried out by means of a wireless protocol such as wifi, 3G, 4G, and/or Bluetooth. These data exchanges can take the form of sending and receipt of files, preferably encrypted and associated with a specific receiver key. The communication module 41 is further capable of allowing communication between the bracelet 40 and a remote terminal, including a client. The client is generally any hardware and/or software capable of access to the bracelet 40 and for example allowing its configuration or the consultation of personal data.

Further, the bracelet 40 according to the invention can comprise a processor and a display module 49 letting it for example display personalised alert messages. It can further comprise a geolocation chip 44 of type GNSS (including GPS), an accelerometer 45, and a communication chip GSM 46 associated with a SIM card 47, preferably being fixed irremovably to the device (e.g. welded) and comprising a preferably encrypted memory 48. This encrypted memory 48 can especially be used for storage of personal data and constitute the storage module 42.

The bracelet 40 according to the invention can also comprise an actuator configured to send an alert message to the operator responsible for the participant after its activation and/or send an alert message to emergency services. Further, these messages can be accompanied by identification data on the participant wearer of the bracelet and also by position data on the participant wearer of the bracelet.

As shown in FIG. 2, according to a second aspect also the invention relates to a system 1 of management of personal data in the scope of a mass gathering, said system 1 of management comprising the electronic bracelet 40 according to the invention and a secure platform 100. This secure platform 100 is more particularly in charge of processing information, planning and generating instructions especially for the electronic bracelet 40.

The secure platform 100 of the system 1 according to the invention comprises a personal data module 110, configured to store personal data of the participant and optionally personal data of the operator responsible.

The secure platform 100 of the system 1 according to the invention comprises an encryption module 120, configured to perform an encryption step on personal data and more widely on all data managed by the secure platform and having to be protected. The data can for example be encrypted according to a symmetrical or asymmetrical encryption algorithm such as for example an algorithm selected from the following encryption algorithms: RSA, DSA ("Digital Signature Algorithm"), DES ("Data Encryption Standard"), triple DES, AES ("Advanced Encryption Standard").

Data, such as personal data, are preferably encrypted according to an encryption algorithm symmetrical by blocks. Encryption by blocks consists of cutting data to be encrypted into successive blocks whereof the size (in bits) is a function of the selected algorithm, for example in blocks of 128 bits each, and successively encrypting each block especially in the initial order to obtain corresponding encrypted blocks of 128 bits each for example. Further, in block chaining mode (type CBC, for "Cipher Block Chaining"), the block precedent encrypted is used to encrypt the following block. Encryption algorithms symmetrical by blocks include especially AES, DES, algorithms according to the standard ISO/IEC 18033-3, algorithms Camellia, HIGHT, Blowfish, Serpent or Twofish.25.

The secure platform 100 of the system 1 according to the invention comprises a preparation module of personal data 130, configured to verify the completeness of the personal data and if necessary to standardise them. The preparation module of personal data 130 can also be configured to anonymise the personal data once the electronic bracelets 40 and the third-party devices 51 are configured. The preparation module of personal data 130 can also be configured to initiate an anonymization procedure of personal data in case of attack detected on the secure platform 100.

The secure platform 100 of the system 1 according to the invention comprises a data analysis module 140. This data analysis module 140 is especially configured to generate data analysed from data coming from the personal electronic bracelet 40 but also originating from other devices such as advantageously a calculation device of the distribution of participants over the geographic site of the mass gathering.

The secure platform 100 of the system 1 according to the invention comprises a recording module 150. It can comprise a transitory memory and/or a non-transitory memory. The non-transitory memory can be a support such as a CDrom, a memory card, or a hard drive for example hosted by a remote server.

As has been said, apart from management of personal data of the participant at the mass gathering, based on former data previously recorded the system according to the invention can also create models for anticipating a situation of risk and prevent it from occurring. For this, the secure platform 100 can also comprise a learning module 160.

The learning module 160 is capable of executing algorithms based on supervised or non-supervised learning methods. In this way, advantageously, the secure platform 100 is configured to implement input data in one or more algorithms, preferably previously calibrated. These algorithms can present different versions as a function of the time of a period of the gathering. For example, in terms of the pilgrimage, three periods can be considered: the Hajj or pilgrimage, the minor pilgrimage and the rest of the year. This makes it possible to refine the predictions resulting from the models. These algorithms can have been constructed from different learning models, especially partitioning, supervised or non-supervised. A non-supervised learning algorithm can for example be selected from a model of non-supervised Gaussian mix, a hierarchical clustering agglomerative, a hierarchical clustering divisive. Alternatively, the algorithm is based on a supervised statistical learning model configured so as to minimise risk of the sequencing rule and to obtain more effective prediction rules. In this case, the steps for calculating determination and estimations can be based on a model, resulting in a set of data and configured to predict a label. For example, for calibration purposes, it is possible to use a set of data representative of a situation whereof the label is known, for example the number of participants in a zone counted manually. The data set can also comprise multiple labels. The algorithm can come from use of a supervised statistical learning model selected for example from the kernel methods (e.g. Large-Margin Separators—Support Vector Machines SVM, Kernel Ridge Regression) described for example in Burges, 1998 (Data Mining and Knowledge Discovery. A Tutorial on Support Vector Machines for Pattern Recognition), sets methods (e.g. decision trees) described for example in Brieman, 2001 (Machine Learning. Random Forests), FP-Growth, Apriori, hierarchical clustering, k-means clustering, decision trees, logistical regression or neurone networks described for example in Rosenblatt, 1958 (The perceptron: a probabilistic model for information storage and organization in the brain).

The secure platform 100 of the system 1 according to the invention comprises a supervision module 170.

The secure platform 100 of the system 1 according to the invention comprises a communication module 180. Further, by way of this communication module 180 the secure platform 100 is capable of communicating with a plurality of devices or systems involved in the management of personal data of a participant at the mass gathering. These devices or systems can for example be selected from: portable data readers, control checkpoints, vehicles. In this way, the communication module 180 is configured to receive and transmit information to remote systems such as sensors, tablets, telephones, computers or servers. The communication module 180 transmits the data over at least one communication network and can comprise wired or wireless communication. Preferably, the communication is operated by means of wireless protocol such as wifi, 3G, 4G, and/or Bluetooth. These data exchanges can take the form of sending and receiving files, preferably encrypted and associated with a specific receiver key. Also, via its communication module 180, the secure platform 100 is capable of communicating directly with the communication module 41 of the personal electronic bracelet 40.

During mass gatherings and especially during the Hajj pilgrimage, major congestion can occur due to the convergence of big groups of pilgrims at road intersections or at the pilgrimage sites, partly being due to non-respect of schedules. In this way, the secure platform 100 of the system 1 according to the invention comprises advantageously a planning and access control module 190. This module for example correlates distribution information of participants in the mass gathering with visit planning information and positioning information of the personal electronic bracelet 40 so as to generate access authorisations of some zones to the wearer of said bracelet 40.

The different modules of the bracelet or of the secure platform 100 are represented separately in FIGS. 1 and 2 but the invention can provide various types of arrangement such as for example a single module combining all the functions described here. Similarly, these means can be divided into several electronic cards, or else assembled onto a single electronic card. Further, when an action is ascribed to a device or a module, the latter is in fact performed by a microprocessor of the device or module controlled by instruction codes recorded in a memory. Similarly, if an action is ascribed to an application, the latter is in fact performed by a microprocessor of the device in a memory of which the instruction codes corresponding to the application are recorded. When a device or module sends or receives a message, this message is sent or received by a communication interface.

Further, the bracelet and the system according to the invention can comprise one or more man-machine interfaces. In terms of the invention the man-machine interface corresponds to any element allowing a human being to communicate with a computer in particular and without this list being exhaustive, a keypad and means for responding to the orders input via the keypad to display data and by means of the mouse or of a trackpad optionally select elements displayed on the screen. Another embodiment is a touch screen for selecting directly on the screen the elements touched by finger or object and optionally with the possibility of displaying a virtual keypad.

The management system 1 according to the invention comprises, or is associated with, an organizer server 10. The organizer server corresponds for example to the server of the entity responsible for organisation of the presence of the participant at the mass gathering.

The management system 1 according to the invention comprises, or is associated with, an authority server 20. The authority server corresponds for example to the server of the entity responsible for administration of the mass gathering and especially management of authorisations of presence. Preferably, exchanges between the secure platform 100 and the authority server 20 are secure exchanges (encrypted).

The management system 1 according to the invention comprises, or is associated with, a third-party server 50. The third-party server corresponds for example to the server of a third-party entity (hospitals, security agency, hotels, government organisation) whereof access to personal data is wanted. The management system 1 according to the invention comprises, or is associated with, a third-party device 51. The third-party device 51 can for example be a reader, a sensor, a tablet, a telephone or a computer. The third-party device 50 is capable of sending an identifier or an identification key to the personal electronic bracelet 40, receiving personal data of the participant in encrypted form and decrypting only some of the personal data of the participant. The third-party device could receive all personal data of the participant or only some of the data of the participant. By contrast, the third-party device could access only some of the personal data, this being a function of its identification key.

Decrypting some of the personal data can be done in the region of the third-party device 51. For example, on receipt of encrypted data, the application on board the third-party device 51 restores the raw textual data from the message received, involving verifications of integrity and authenticity by means of a message authentication code, then decryption of the encrypted data. Alternatively, decryption can be performed in the region of the personal electronic bracelet 40 prior to sending.

During mass gatherings, some individuals try to attend these gatherings without having completed the required formalities or without wanting to reveal their identity. To eliminate this, the organizers generally set up verification procedures taking into account both the identity of people and also by acquired authorisations. In this context, vehicles, especially public transport vehicles are a place of choice for concealment of unregistered participants and they also constitute a source of slowdown during checks.

In this way, to prevent such frauds and slowdowns, the third-party device can be a third-party device for access control 60 to a vehicle, preferably a public transport vehicle. Such a device can for example be positioned in the region of the entry of a vehicle and will be configured to access some of the personal data of the participant, check them for example via comparison of these data with a list of participants authorised to board said vehicle, then record personal data of the participant boarding the vehicle.

During control steps, the vehicle equipped with the third-party control device 60 for access to a vehicle could transmit, for example to a vehicle control device, a list of passengers-participants of this vehicle with some of their personal data. The verification will then be much faster.

In this context, one-off verifications could be performed and based on control results the learning module could set up a vehicle control model for predicting the risk of fraud as a function of the performance of the vehicle.

The invention also relates to a step 200 of configuration of the personal electronic bracelet 40 according to the invention.

This configuration can comprise especially the following steps:
- Configuration of the electronic closing mechanism 43 such that it is capable of changing state following receipt of a change of state datum predetermined.
- Recording of personal encrypted data on the storage module 42, and
- Configuration of the communication module 41 such that it is capable of transmitting some of the encrypted personal data following receipt of an identification datum from an authorised third-party device 51.

In terms of mass gathering, it is probable that participants come from different countries and do not share the same language or the same culture. Consequently, the configuration method of the bracelet can comprise a prior step of loading personal data and processing of these personal data.

Prior to encryption the processing of personal data can for example comprise a step of formalisation of data so as to make them intelligible by third-party entities which will consult these personal data.

An embodiment of this configuration is presented in FIG. 3 which is a diagram illustrating the exchanges between the various elements of the system according to the invention described hereinabove within the scope of configuration of a personal electronic bracelet 40. FIG. 3 refers in particular to the secure platform 100, the organizer server 10, the authority server 20 and to the personal electronic bracelet 40.

During a first step 201, the organizer server 10 sends personal data of a participant to the secure platform 100. During this step, the organizer server 10 can also transmit data on the responsible person who will be in charge of participants during the mass gathering. When the secure platform 100 receives these data, it can undertake initial processing 210 so as to verify the compliance and completeness of the data sent. At this time, it can also modify the personal data to have them correspond to a standard required by the authority server 20.

Next, the secure platform 100 sends 211 at least some of these personal data of the participant to the authority server 20. The secure platform 100 can send all personal data received or else send some only. Preferably, it sends only some of the received personal data. During this step, the secure platform 100 can also transmit data on the responsible person who will be in charge of participants during the mass gathering.

When the authority server 20 receives these data, it can launch verification 220 of the data received, as well as a validation procedure 230 of registration of the participant for the mass gathering.

If a conflict is detected (NOK), then the authority server 20 sends to the secure platform 100 a refusal during a step 231. If not (OK) a step 240 is conducted to set up a transaction request which will configure the third-party devices.

During a step 241, the transaction request and the validation of participation of the participant is sent to the secure platform 100. The transaction request can especially include identifiers for the third-party devices 51 which will be capable to access data stored on the personal electronic bracelet 40.

When the secure platform 100 receives these data, it can inform the organizer of this, for example via a transmission step 242 of data to the organizer server. It also engages a step 250 for preparation of data. Preparation 250 of data on the secure platform 100 can especially comprise:
- The encryption of personal data
- The recording of personal encrypted data on the secure platform
- The association of personal data with organizer data
- The association of personal data with data from third parties
- The association of personal data with access conditions, and/or
- The association of personal data with unlocking conditions of the personal device Details on the configuration of third-party devices 51 will be given during the description of FIG. 4.

After transmission 251 of personal encrypted data to the organizer server or to the personal electronic bracelet 40, the personal encrypted data are recorded 260 on the personal electronic bracelet 40. Further, organizer data can also be recorded there, encrypted or not.

During a step 270 of opening configuration, which can also be prior to step 260, the bracelet is configured so it can be locked and unlocked only when it receives the change of state datum. Preferably, it is configured so it can be locked and unlocked only when the device receives a signal corresponding to the fingerprint of the responsible for the participant.

During a step 280 for access configuration to data, which can also be prior to steps 260 and 270, the bracelet is configured such that the personal data can be accessible by third-party devices 51 only, corresponding to predetermined access keys.

Further, the encryption of personal data is such that each third-party device 51 will have access to only some of the personal data contained in the bracelet.

The invention also relates to a configuration step 300 of a third-party device 51 capable of accessing some of the information personal encrypted recorded on the personal electronic bracelet 40 according to the invention. This configuration 300 of a third-party device 51 can comprise especially the following steps:
- Creation 310 of a unique identification key, capable of allowing access of a third-party device 51 to a personal electronic bracelet 40. In this way, the personal electronic bracelet 40 will send the personal data to a third-party device only which will have sent the proper key, said key being different for each personal device.
- Creation 320 of a decryption key of personal encrypted data, capable of decrypting only some of the personal data of the personal electronic bracelet 40.
- Recording of the unique identification key and of the decryption key on a third-party device 51.

FIG. 4 is a diagram illustrating the exchanges between the various elements of the system according to the invention described hereinabove within the scope of the configuration 300 of a third-party device 51. FIG. 4 refers in particular to the secure platform 100, the organizer server 10, the authority server 20, to a third-party server 50 and to a third-party device 51.

During a first step 301, the authority server 20 sends a transaction request to the secure platform 100. This transaction request comprises in particular personal data of a participant. Advantageously, the transaction request can be made for a plurality of personal bracelets. In fact, one organizer will be in charge of the organisation of the participation of several people at the mass gathering. In this way, the authority server has the option of sending a transaction request for all the people who have been authorised to participate in the event. In this way, the transaction request comprises personal data of at least one participant. These personal data refer especially to the identity of the participant.

Further, the transaction request comprises data relative to the third-party devices 51 or the third-party bodies which will be authorised to access some of the information contained in the personal electronic bracelet 40. The transaction request can comprise more particularly a list of identifiers of third-parties which can access the bracelet.

Once the transaction request is received, the secure platform initiates a step 210 of preparation of personal data. For example, the personal data of the participant can be encrypted such that each third party listed in the transaction request can access some of these data, the extent of the data which it can access being a function of the key.

The method can also comprise a step 310 of creation of a unique identification key between each third party and personal device such that the personal bracelet sends the personal data to a third-party device only, which will have sent the proper key, said key being different for each personal device. In this way, this step 310 comprises advantageously the construction of at least one key for each third party ($ID_n$) having access authorisation to some of the data contained in the personal bracelet. These keys are transmitted, for example to a third-party device 51, during a step 311.

The method can also comprise a step 320 of creation of encryption keys ($K_n$) of encrypted data capable of decrypting some of the personal data of the bracelet. Next, the encryption keys are transmitted 321 to a third-party server 50 or directly to third-party devices 51. If the encryption keys are transmitted to a third-party server 50 then the latter sends 314 the keys to the third-party devices 51 and receives 315 an acknowledgement of receipt.

Once the keys and the identifiers are received, the third-party server or if appropriate the third-party device 51 sends to the secure platform 100 a message of acknowledgement of receipt of data during a step 312, 322.

During a step 313, 323, the secure platform 100 having recused acknowledgement of receipt now sends a report to the authority server making a review of the data transmitted and setting up the end of the transaction for putting third-party devices in place. This secure platform 100 is more particularly responsible for processing information, planning and generation of instructions especially going to the electronic bracelet 40.

The invention also relates to an access step 400 to the personal data of the participant by a third-party device 51. The personal data of the participant being encrypted and recorded on the personal electronic bracelet 40 according to the invention. This access 400 can comprise especially the following steps:

Creation 310 of a unique identification key, capable of allowing access of a third-party device 51 to a personal electronic bracelet 40. In this way, the personal electronic bracelet 40 will send the personal data to a third-party device only which will have sent the proper key, said key being different for each personal device.

Creation 320 of a decryption key of personal encrypted data, capable of decrypting only some of the personal data of the personal electronic bracelet 40.

Recording of the unique identification key and of the decryption key on a third-party device 51.

FIG. 5 is a diagram illustrating the exchanges between the various elements of the system according to the invention described hereinabove in the scope of the access 400 to personal data. FIG. 5 refers in particular to the personal electronic bracelet 40 and to a third-party device 51.

During a first step 401, the third-party device 51 sends to the personal electronic bracelet a transaction request. This transaction request comprises in particular a unique identification key ($ID_1$) allowing the bracelet to recognise the third-party device 51 as an authorised third-party device which can access some of the personal data of the participant. Preferably, the personal data are transmitted to authorised third parties only. In fact, it is not preferable for just any device to be able to access information contained in the personal electronic bracelet 40. In this way, preferably, the data are transmitted on receipt 405 only of an authorised identifier or a unique identification key.

Once the identifier is verified 410 and approved (OK) the personal data of the participant accessible by this third-party device 51 are prepared 420. In case of unauthorised access by a third-party device, the bracelet can send an alert message to the secure platform.

The personal data are sent 421 to the third-party device 51 and are then decrypted during a step 430 by way of an adapted decryption key.

As a function of third-party devices and their authorisation, the accessible personal data will be different. In this way, third-party devices dedicated to security agents could access personal data such as name, first name, and coordinates of the operator, whereas third-party devices dedicated to doctors could access personal data such as name, first name, coordinates of the operator and medical data. Finally, third-party devices dedicated to agents of a control authority at borders could access all personal data relative to identity but not could access medical data.

In this way, the invention improves the overall experience of a participant and especially makes verification of the identity of the participant easy, his transport and his medical processing, the combat against fraud and planning of the gathering by considering the distribution of participants.

The invention claimed is:

1. A personal electronic bracelet for management of personal data of a participant at a mass gathering, said bracelet comprising:
    a communication module adapted to receive personal data of the participant in encrypted form, said communication module being configured to communicate with a plurality of third-party devices and allow access, by at least one of the third-party devices, to only some of the personal data of the participant, based on a unique identification key included in a list of identifiers for respective ones of said third-party devices,
    a storage module adapted to store the personal encrypted data of the participant, and
    an electronic closing mechanism configured to change state following receipt of a change of state datum.

2. The bracelet according to claim 1, wherein the change of state datum is a biometric datum associated with an operator responsible for said participant.

3. The bracelet according to claim 1, wherein the personal data of the participant comprise: identity data, travel data and health data.

4. The bracelet according to claim 1, said bracelet being configured to send a message via the communication module to an operator responsible for said participant should said bracelet be opened by force.

5. A management system of personal data in the scope of a mass gathering, said management system comprising the personal electronic bracelet according to claim 1 and a secure platform, said secure platform comprising a personal data module configured to store personal data of the participant.

6. The management system according to claim 5, further comprising at least one third-party device configured to access only some of the personal data of the participant.

7. The management system according to claim 6, wherein at least one of the third-party devices is capable of accessing personal data comprising a visa number, comparing the visa number to a predetermined list and generating an alert instruction as a function of said comparison.

8. The management system according to claim 6, wherein at least one of the third-party devices is a third-party device for access control to a vehicle configured to:
 access some of the personal data of the participant,
 control some of the personal data of the participant, then
 record personal data of the participant if the participant is authorised to enter the vehicle.

9. The management system according to claim 5, wherein the secure platform comprises an analysis module configured to:
 receive an alert message coming from said personal electronic bracelet of a participant, load a geographic position of the personal electronic bracelet, load distribution data of participants and determine a zone having high probability of a risk of crowd movement from loaded data; and/or
 receive an alert message from said personal electronic bracelet of a participant, load a geographic position of the personal electronic bracelet, load distribution data of participants and generate propositions of optimal ways for dispatching care and evacuation of a participant wearer of the bracelet.

10. The management system according to claim 5, wherein the secure platform comprises a planning and access control module configured to correlate distribution information of participants with the mass gathering, with visit planning information and positioning information of the personal electronic bracelet so as to generate access authorisations to zones for a wearer of said bracelet.

11. The management system according to claim 10, wherein the planning and access control module is configured to:
 receive an access authorisation request to a zone by the personal electronic bracelet, load visit planning data for the wearer of said bracelet and transmit access authorisation to the personal electronic bracelet or to a third-party device as a function of a schedule and the visit planning data;
 identify a position of the personal electronic bracelet, load said visit planning data for the wearer of said bracelet and transmit to the personal electronic bracelet a message as a function of the schedule, of the position of the bracelet and the visit planning data;
 load distribution data of participants, load said position of the personal electronic bracelet and determine planning of visits as a function of loaded data; and/or
 transmit to a server, or a third-party device, personal data of the participant having exceeded an allocated time on a zone.

12. A management method of personal data in the scope of a mass gathering, said personal data being recorded on the personal electronic bracelet according to claim 1, said method comprising a configuration step of the personal electronic bracelet comprising the following steps:
 configuration of the electronic closing mechanism such that it is capable of changing state following receipt of said change of state datum,
 recording of said personal encrypted data on the storage module, and
 configuration of the communication module such that it is capable of transmitting some of the personal encrypted data following receipt of an identification datum from an authorised third-party device.

13. A management method of personal data in the scope of a mass gathering, said personal data being recorded on the personal electronic bracelet according to claim 1, said method comprising a configuration step of a third-party device comprising the following steps:
 creation of the unique identification key, capable of allowing access of the third-party device to the personal electronic bracelet,
 creation of a decryption key of said personal encrypted data, capable of decrypting only some of the personal data of the personal electronic bracelet, and
 recording of the unique identification key and of the decryption key on the third-party device.

* * * * *